United States Patent [19]
Sheehan et al.

[11] Patent Number: 6,143,270
[45] Date of Patent: *Nov. 7, 2000

[54] ANHYDROUS MAGNESIUM CHLORIDE

[75] Inventors: Gregory John Sheehan, Chapel Hill; Fook-Sin Wong, Jindalee; Michael Matthew Hourn, Carindale, all of Australia; Manabu Kodama, Ube, Japan; David Hughes Jenkins, Ormonde, Australia

[73] Assignees: Commonwealth Scientific and Industrial Research Organisation, Victoria; Australian Magnesium Corporation Pty Ltd., Queensland, both of Australia

[ * ] Notice: This patent issued on a continued prosecution application filed under 37 CFR 1.53(d), and is subject to the twenty year patent term provisions of 35 U.S.C. 154(a)(2).

[21] Appl. No.: 08/638,778

[22] Filed: Apr. 29, 1996

Related U.S. Application Data

[63] Continuation-in-part of application No. PCT/AU94/00662, Oct. 28, 1994.

[30] Foreign Application Priority Data

Oct. 28, 1993 [AT] Austria .................................. PM2065
Oct. 28, 1994 [WO] WIPO ..................... PCT/AU94/00662

[51] Int. Cl.[7] ................................ C01F 5/32; C25C 3/04
[52] U.S. Cl. .......................................... 423/498; 205/404
[58] Field of Search ............................. 423/498; 205/404

[56] References Cited

U.S. PATENT DOCUMENTS

| | | |
|---|---|---|
| 2,381,994 | 8/1945 | Belchetz . |
| 2,381,995 | 8/1945 | Belchetz . |
| 3,014,780 | 12/1961 | Clarke . |
| 3,092,450 | 6/1963 | Christensen . |
| 3,341,282 | 9/1967 | Kimberlin, Jr. . |
| 3,345,128 | 10/1967 | Nightingale, Jr. . |
| 3,347,626 | 10/1967 | Nightingale, Jr. . |
| 3,352,634 | 11/1967 | Buchmann . |
| 3,962,408 | 6/1976 | Dolezal ................................... 423/498 |
| 3,966,888 | 6/1976 | Braithwaite ............................. 423/498 |
| 3,983,224 | 9/1976 | Alain et al. ............................. 423/498 |
| 4,105,747 | 8/1978 | Eisele et al. ........................ 423/498 X |

(List continued on next page.)

FOREIGN PATENT DOCUMENTS 2045736A 11/1980 United Kingdom .

OTHER PUBLICATIONS

"A New Econcomical for Making Anhydrous Magnesium Chloride", Dr. Ronald J. Allain, Nalco Chemical Co., Texas, pp. 929–937. No Month No Year.

"New Economical Method for Producing Anhydrous Magnesium Chloride", Dr. Ronald J. Allain, pp. 62–64, Jun. 1979.

*Primary Examiner*—Donald R. Valentine
*Attorney, Agent, or Firm*—Jacobson, Price, Holman & Stern, PLLC

[57] ABSTRACT

Anhydrous magnesium chloride is prepared by a process in which hydrated magnesium chloride (10) is mixed in a vessel (11) with ethylene glycol (12). The mixture (13) is dehydrated in distillation columns (14, 15 and 16) with the dehydrated ethylene glycol magnesium chloride solution (20) pumped into a crystalliser (21) simultaneously with the separate addition of anhydrous ammonia gas (22) to the crystalliser (21). Prior to the introduction of reactants (20 and 22), the crystalliser (21) contains ethylene glycol saturated with ammonia. A crystalliser slurry of magnesium chloride hexammoniate (23) is continuously pumped from the crystalliser (21) into a pressure filter (24) where the crystals are washed with methanol saturated with ammonia (26). The washed crystals (27) are transferred to a fluidised bed calciner (28) where methanol is evaporated from the crystals at 120° C. and thereafter the crystals are calcined to anhydrous magnesium chloride at 450° C.

39 Claims, 1 Drawing Sheet

U.S. PATENT DOCUMENTS

| | | | |
|---|---|---|---|
| 4,195,070 | 3/1980 | Allain et al. | 423/498 |
| 4,195,071 | 3/1980 | Allain et al. | 423/498 |
| 4,201,758 | 5/1980 | Allain et al. | 423/497 |
| 4,208,392 | 6/1980 | Allain et al. | 423/497 |
| 4,228,144 | 10/1980 | Kono et al. | 423/498 |
| 4,248,838 | 2/1981 | Allain et al. | 423/162 |
| 4,800,003 | 1/1989 | Peacey et al. | 205/404 |
| 5,439,563 | 8/1995 | Sivilotti | 205/404 |
| 5,514,359 | 5/1996 | Sivilotti et al. | 423/498 |
| 5,565,080 | 10/1996 | Peacey et al. | 205/404 |

FIG. 1

ANHYDROUS MAGNESIUM CHLORIDE

This is a continuation-in-part application of PCT/AU94/00662 filed Oct. 28, 1994.

TECHNICAL FIELD

The present invention relates to a process for the production of substantially anhydrous magnesium chloride, to substantially anhydrous magnesium chloride produced by the process, and to substantially anhydrous magnesium chloride per se.

BACKGROUND ART

Substantially pure magnesium metal can be electrolytically produced from magnesium chloride with evolution of chlorine gas. However, if hydrated magnesium chloride is used as the feed to the electrolytic cell, the efficiency of the cell significantly decreases over a short period of time as oxides of magnesium are formed which corrode the electrodes and produce a sludge which must be periodically removed from the cell. Magnesium chloride feeds also typically contain impurities such as hydrocarbons, boron and other metal salts which also substantially reduce the efficiency of the electrolytic cell. Accordingly, it is desirable to produce substantially pure anhydrous magnesium chloride which is suitable for electrolytic production of magnesium metal.

Depending upon the temperature, magnesium chloride isolated from aqueous solutions contains a variety of numbers of molecules of water of crystallisation. Hydrated forms of magnesium chloride can be dehydrated to some extent by heating. However, hydrated magnesium chlorides tend to melt in their own water of crystallisation to form a thickened partially dehydrated product which is very difficult to further dehydrate by heating. Further, it is not possible to fully dehydrate magnesium chloride by heating in air because magnesium chlorides containing less than two waters of crystallisation undergo hydrolytic decomposition with evolution of hydrogen chloride rather than dehydration. Accordingly, alternative approaches have been proposed for the production of anhydrous magnesium chloride.

Anhydrous magnesium chloride can be made by direct chlorination of magnesium and by drying with hydrogen chloride gas. The former process is clearly not a viable method for producing anhydrous magnesium chloride for use in the electrolytic production of magnesium metal. In the latter process, hydrated magnesium chloride is made into pellets which are placed in a column and are purged by hot hydrogen chloride to remove all traces of water. This latter process has not proven to be very efficient as there are generally hydrated forms of magnesium chloride present at the end of the process which may, in subsequent uses, convert to oxides of magnesium which are not desired. Further, this process requires the use of large quantities of hydrogen chloride gas which has many problems associated with its storage and use.

An alternative approach to the production of anhydrous magnesium chloride has involved forming a solution of hydrated magnesium chloride in a solvent, removing water from the solution, forming a magnesium chloride complex by reaction of the water-free solution with a precipitating agent and heating the magnesium chloride complex to produce anhydrous magnesium chloride. A number of variations of this general approach have been proposed in patent literature over the years with a common feature of the variations being the use of ammonia as the precipitating agent. Such processes are hereafter referred to as ammoniation processes. Various problems have been associated with ammoniation processes and the present applicants are not aware of anhydrous magnesium chloride having ever been commercially produced by an ammoniation process.

The desired magnesium chloride complex which is heated to produce anhydrous magnesium chloride in an ammoniation process is magnesium chloride hexammoniate ($MgCl_2.6NH_3$). Where ethylene glycol is used as the solvent for forming the solution of hydrated magnesium chloride, the present inventors have ascertained that magnesium chloride glycollate compounds can be formed during an ammoniation process in addition to or in lieu of magnesium chloride hexammoniate. Magnesium chloride glycollate compounds include magnesium chloride triglycollate ($MgCl_2.3(HOCH_2.CH_2OH)$) and magnesium chloride biglycollate biammoniate ($MgCl_2.2(HOCH_2.CH_2OH).2NH_3$). The present inventors have identified characteristic X-Ray Diffraction (XRD) patterns and Fourier Transform Infrared (FTIR) spectra for magnesium chloride glycollate compounds by which the presence of such compounds can be identified. Details are provided in Tables 1–4. Magnesium chloride glycollate compounds are undesirable in an ammoniation process as they are believed to decompose on heating to form oxygen containing compounds which contaminate the is desired anhydrous magnesium chloride product. The introduction of oxygen into an electrolytic cell into which the product is fed in the production of magnesium metal reduces both the life of carbon anodes typically used in such cells and the efficiency of the cell.

U.S. Pat. No. 2,381,995, which was filed in 1942 and assigned to The M W Kellogg Company, teaches an ammoniation process with a preference for isoamyl alcohol as the solvent used to form the solution of hydrated magnesium chloride and ammonia as the precipitating agent with magnesium chloride hexammoniate identified as the magnesium chloride complex which is heated to form anhydrous magnesium chloride. U.S. Pat. No. 2,381,995 also teaches thorough intermixing of the water-free solution of magnesium chloride and the ammonia prior to their introduction to a cooler where the magnesium chloride hexammoniate is said to precipitate.

U.S. Pat. No. 3,966,888, which was filed in 1975 and assigned to the Nalco Chemical Company, also teaches an ammoniation process. In discussing U.S. Pat. No. 2,381,995, U.S. Pat. No. 3,966,888 states that U.S. Pat. No. 2,381,995: "relies upon dissolving a hydrated magnesium chloride in a monohydroxy saturated aliphatic alcohol. This solution is then heated for a period of time sufficient to drive off the water present. The alleged water-free solution is treated with ammonia to precipitate a magnesium chloride ammonia complex which is then separated from the alcohol and heat-treated to drive the ammonia from the complex.

The difficulties experienced in actually practicing the techniques of U.S. Pat. No. 2,381,995 readily indicate to one skilled in the art that its method is inherently incapable of being adapted to large scale commercial operations.

In the first instance, when the alcohol solution of the hydrated magnesium chloride is heated to remove water therefrom, it is impossible to remove the water at about the boiling point of the alcohol employed. This is particularly true when isoamyl alcohol is used as the solvent for the hydrated magnesium chloride. Thus, the magnesium chloride is not fully dehydrated. When the alleged water-free magnesium chloride is ammonia precipitated from the alcohol as represented by the patentee in U.S. Pat. No. 2,381, 995, a dense, wax-like precipitate occurs which contains large quantities of entrained alcohol. The density and wax-like character of the precipitate renders it incapable of being handled by commercial equipment to free the precipitate of entrained solvent. Thus, it is impossible to further process the precipitate without substantial losses of the solvent taking place during the ammonia removal phase of the process."

U.S. Pat. No. 3,966,888 broadly claims a "method of preparing anhydrous magnesium chloride from magnesium chloride hydrates which comprises the steps of:

A) dissolving a magnesium chloride hydrate in ethylene glycol to form an ethylene glycol magnesium chloride hydrate solution;

B) heating the ethylene glycol magnesium chloride hydrate solution to a temperature and for a period of time sufficient to remove all the water therefrom to produce an ethylene glycol anhydrous magnesium chloride solution;

C) treating the ethylene glycol anhydrous magnesium chloride solution with ammonia to form a magnesium chloride ammonia complex which is insoluble in the ethylene glycol, with the temperature of the ethylene glycol magnesium chloride solution being within the range of between −15° to 50° C.;

D) separating the magnesium chloride ammonia complex from the ethylene glycol;

E) washing the magnesium chloride ammonia complex with a polar solvent having a lower boiling point than ethylene glycol to remove any ethylene glycol entrained in the magnesium chloride ammonia complex;

F) heating the magnesium chloride ammonia complex to a temperature and for a period of time sufficient to drive off the ammonia, thereby forming anhydrous magnesium chloride; and then, G) recovering anhydrous magnesium chloride which has a magnesium oxide content less than 0.8% by weight."

U.S. Pat. No. 3,966,888 also claims the above method in which, in relation to step C), it is more narrowly specified that a) the ethylene glycol anhydrous magnesium chloride solution that has been cooled to between −15° and 50° C. is treated with at least 6 moles of ammonia, based on the magnesium chloride present in the ethylene glycol; and b) the ethylene glycol anhydrous magnesium chloride solution is cooled to between 0° and 25° C. prior to ammonia addition thereto.

In describing step C), U.S. Pat. No. 3,966,888 teaches that:

"The anhydrous ethylene glycol magnesium chloride solution is then cooled to about −15°–50° C. and, preferably, within the range of 0°–25° C. At this point the solution is treated with anhydrous ammonia to provide at least 6 moles of ammonia and, preferably, at least 9 moles of ammonia per mole of magnesium chloride present in the ethylene glycol solution. The ammonia addition can be relatively rapid although in small-scale laboratory preparations, the ammonia addition should take place over a period of time ranging between 1–2 hours.

It was found that by cooling the magnesium chloride ethylene glycol solution to the temperature indicated that the ammonia is more soluble therein and that a precipitate does not form until at least 6 moles of the ammonia have been added. After most of the ammonia is added to the glycol, a fine, white, grainy precipitate begins to form which is a water-free ammonia complex of the magnesium chloride."

In exemplifying step C), U.S. Pat. No. 3,966,888 teaches that the ethylene glycol anhydrous magnesium chloride solution is cooled to 15° C. and approximately 9 moles of anhydrous ammonia is added to the cooled solution over a period of one hour with a precipitate beginning to form after half an hour of ammonia addition.

U.S. Pat. No. 3,966,888 also teaches a preference for the ethylene glycol anhydrous magnesium chloride solution to contain 8–12% by weight magnesium chloride.

A paper entitled "A New Economical Process for Making Anhydrous Magnesium Chloride" by Dr Ronald J Allain of the Nalco Chemical Company (hereafter referred to as the Allain paper) was published in 1980 and discusses an ammoniation process based on the teaching of U.S. Pat. No. 3,966,888. In relation to step C) of U.S. Pat. No. 3,966,888, the Allain paper teaches that in order to separate magnesium chloride from the anhydrous magnesium chloride in ethylene glycol solution, gaseous anhydrous ammonia is bubbled through the solution. The ammonia is said to immediately dissolve, first saturating the ethylene glycol and then forming a magnesium chloride hexammoniate precipitate. The paper specifies that it is most convenient to do the ammoniation in a simple stirred tank arrangement with the ammonia introduced slightly above atmospheric pressure. The reaction is said to be essentially instantaneous with no ammonia escaping through the vent under the conditions employed with cooling water used to remove the majority of the heat liberated. The paper specifies that in practice, the reactor is allowed to heat up to 70° C. and is then chilled during the course of the reaction to the final temperature of 15–30° C. Accordingly, the teaching of the Allain paper is essentially the same as step C) of U.S. Pat. No. 3,966,888, ie. the ethylene glycol magnesium chloride solution is treated with ammonia by placing the ethylene glycol magnesium chloride solution in a vessel and thereafter adding ammonia to the vessel. One difference between the Allain paper and U.S. Pat. No. 3,966,888 is that the Allain paper refers to cooling of the reactor from 70° C. to 15–30° C. during the course of the ammonia addition; whereas, U.S. Pat. No. 3,966,888 requires the temperature of the ethylene glycol magnesium chloride solution to be within the range of −15–50° C. prior to addition of anhydrous ammonia.

The present inventors attempted to produce anhydrous magnesium chloride by following the teachings of U.S. Pat. No. 3,966,888 and the Allain paper with details being provided in a Comparative Example. To that end, an ethylene glycol anhydrous magnesium chloride solution was prepared according to U.S. Pat. No. 3,966,888. The solution, which contained by weight magnesium chloride, was cooled to 15–20° C. and attempts were made to add 6–9 moles of anhydrous ammonia to the cooled solution. However, it was found that the cooled solution was much too viscous to allow the ready injection and dispersion of anhydrous ammonia. The present inventors found that difficulties resulting from the viscosity of the cooled solution were alleviated if the temperature of the ethylene glycol anhydrous magnesium chloride solution was in the order of 70° C. prior to addition of ammonia and that precipitate yield was increased if the temperature following ammonia addition was reduced to 15° C. However, the resultant precipitate was found not to be substantially magnesium chloride hexammoniate as desired but to contain significant amounts of undesirable magnesium chloride glycollate compounds. Accordingly, it is believed that the teachings of U.S. Pat. No. 3,966,888 and the Allain paper are inherently incapable of being used in commercial anhydrous magnesium chloride production.

DISCLOSURE OF THE INVENTION

In a first aspect, the present invention provides a process for producing substantially anhydrous magnesium chloride, the process including the steps of:

(a) forming an alcohol magnesium chloride solution by admixing hydrated magnesium chloride with an alcohol which is miscible with water;

(b) dehydrating the alcohol magnesium chloride solution to form a dehydrated alcohol magnesium chloride solution;

(c) forming a precipitate comprising magnesium chloride hexammoniate by introducing the dehydrated alcohol magnesium chloride solution and ammonia into a reaction vessel containing a non-aqueous solution having an ammonia content of greater than 7% by weight;

(d) recovering the precipitate from the reaction vessel;

(e) washing the recovered precipitate with a washing solvent to form a washed precipitate; and (f) heating the washed precipitate to form substantially anhydrous magnesium chloride.

In the language of step (a) of the process according to the present invention, U.S. Pat. No. 3,966,888 requires the alcohol to be ethylene glycol. In contrast, in the present invention, the alcohol can be selected from a range of alcohols including glycols. The alcohol must be miscible with water and be capable of dissolving hydrated magnesium chloride to form a solution of magnesium chloride. Preferably, the alcohol is one in which hydrated magnesium chloride is at least moderately soluble. For example, the alcohol may be selected from methanol, ethanol, propanol, butanol, ethylene glycol and diethylene glycol. Additionally, alkyl groups of the alcohol may be either branched or straight chained and may contain unsaturation. The alcohol is preferably ethylene glycol.

In step (b), any suitable dehydrating process may be used. For example, distillation, membrane separation, molecular sieves or a combination of such techniques may be used, with distillation being the generally preferred technique. The technique utilised will to some extent depend upon the alcohol used in step (a). For example, where methanol is used as the alcohol in step (a), distillation would be unlikely to be used as the dehydrating process due to difficulties resulting from the boiling point of methanol being less than the boiling point of water. In the generally preferred technique of distillation, the water may be distilled off in standard distillation columns either at atmospheric pressure or under vacuum. Distillation under vacuum is preferred because the temperature required to effect distillation can be minimised to avoid degradation of the alcohol used in the process. For example, if ethylene glycol is used as the alcohol, it is preferred to maintain the temperature of the distillation process under 150° C. to avoid degradation of the ethylene glycol. Step (B) of U.S. Pat. No. 3,966,888 requires the removal of all the water from the ethylene glycol magnesium chloride hydrate solution prior to treatment with ammonia. In contrast, in the present invention, it is not necessary to completely dehydrate the product of step (a) in order to obtain a product of suitable quality for use in step (c). Although not wishing to be bound by theory, this is believed to be a consequence of the different procedure adopted according to step (c). For example, the dehydrated alcohol magnesium chloride solution resulting from step (b) can contain up to 50000 ppm water with no apparent adverse effects on the quality of the substantially anhydrous magnesium chloride resulting from the process.

In step (c), the dehydrated alcohol magnesium chloride solution and ammonia are introduced into a reaction vessel which contains a non-aqueous solution having an ammonia content of greater than 7% by weight. In contrast, U.S. Pat. No. 3,966,888 and the Allain paper teach addition of the ammonia to a vessel which contains the dehydrated alcohol magnesium chloride solution and U.S. Pat. No. 2,381,995 teaches thorough intermixing of the ammonia and the dehydrated alcohol magnesium chloride solution prior to their introduction to a cooled crystallisation vessel.

Although not wishing to be bound by theory, it is believed that production of magnesium chloride hexammoniate by reaction of the dehydrated alcohol magnesium chloride solution and ammonia is favoured at lower temperatures and higher dissolved ammonia concentrations with production of magnesium chloride glycollate compounds more likely at higher temperatures and lower dissolved ammonia concentrations.

In step (c) it is desirable that firstly, there is no contact between the dehydrated alcohol magnesium chloride solution and the ammonia prior to their introduction to the reaction vessel and that secondly, during formation of the precipitate, sufficient ammonia is initially and continually available to react with the dehydrated alcohol magnesium chloride solution to form a precipitate which essentially comprises magnesium chloride hexammoniate. Accordingly, it is preferred that the dehydrated alcohol magnesium chloride solution and the ammonia are separately and simultaneously introduced into the reaction vessel.

The non-aqueous solution may be liquid ammonia but this would necessitate the reaction vessel being a pressure vessel. It is therefore preferred that the non-aqueous solution is a solution of an alcohol that has been treated with ammonia gas. To keep the number of solvents in the process to a minimum, it is preferred that the non-aqueous solution is a solution of the alcohol which is admixed with hydrated magnesium chloride in step (a) of the process.

The non-aqueous solution contains a minimum of 7% by weight ammonia. Preferably, the non-aqueous solution contains greater than 7% by weight ammonia and more preferably, the non-aqueous solution is saturated with ammonia. During operation of step (c), the required level of ammonia in the non-aqueous solution can be achieved by controlling the rates of introduction of the dehydrated alcohol magnesium chloride solution and the ammonia.

Either gaseous or liquid ammonia can be introduced into the reaction vessel in step (c). It is preferred that the ammonia is gaseous anhydrous ammonia.

Distillation is the preferred method for dehydrating the alcohol magnesium chloride solution in step (b) with the result that the dehydrated alcohol magnesium chloride solution available for use in step (c) is of elevated temperature. Notwithstanding that production of magnesium chloride hexammoniate is favoured at lower temperatures, in commercial application of the present invention it is likely to be preferred not to substantially cool the dehydrated alcohol magnesium chloride solution prior to reaction with ammonia because it has been found that even if the temperature has not been reduced prior to reaction, a precipitate comprising substantially magnesium chloride hexammoniate is recoverable. This is believed to be a consequence of the conditions under which the dehydrated alcohol magnesium chloride and ammonia are reacted in the present invention. Where such an approach is adopted, it is preferred that the temperature within the reaction vessel has fallen to below about 45° C. on completion of step (c).

Step (c) can be operated on either a batch processing basis or on a continuous processing basis. Where a batch processing basis is adopted, it is preferred that the temperature within the reaction vessel is less than 45° C. on completion of formation of the precipitate although it is to be understood that the temperature within the reaction vessel may be greater than 45° C. prior to completion of formation of the precipitate. Where a continuous processing basis is adopted, either a single reaction vessel or a series of reaction vessels may be used. In a commercial operation, it is likely to be preferred that step (c) be operated on a continuous processing basis using a series of reaction vessels. Where a continuous processing basis using a single reaction vessel is adopted, it is preferred that the temperature within the reaction vessel is less than 45° C. on completion of formation of the precipitate. Where a continuous processing basis utilising a series of reaction vessels is adopted, it is preferred that the temperature within the last reaction vessel in the series is less than 45° C. on completion of formation of the precipitate.

Although not wishing to be bound by theory, the present inventors believe that the precipitate formed on completion of step (c) does not contain significant amounts of magnesium chloride glycollate compounds because the presence of a significant level of ammonia in the reaction vessel into which the dehydrated alcohol magnesium chloride solution and the ammonia are introduced results in almost instantaneous precipitation of desirable magnesium chloride hexammoniate rather than undesirable magnesium chloride glycollate compounds. Further, where undesirable magnesium chloride glycollate compounds are formed, they are believed to undergo a solid state reaction to magnesium chloride hexammoniate during step (c) because of the continuous availability of a significant amount of ammonia reactant. In contrast, it is believed that step C) of U.S. Pat. No. 3,966,888 results in the formation of a precipitate containing magnesium chloride glycollate compounds because a small stream of ammonia is added to a comparatively large volume of dehydrated alcohol magnesium chloride solution. Further it is believed that magnesium chloride glycollate compounds formed during step C) of U.S. Pat. No. 3,966,888 do not readily convert under the reaction conditions to magnesium chloride hexammoniate because of the lack of ammonia with which they can react. This is believed to result in the magnesium chloride formed in step F) of U.S. Pat. No. 3,966,888 being of poorer quality than that produced according to the first aspect of the present invention.

In step (d), the precipitate can be recovered from the reaction vessel by any suitable method. For example, centrifugation, decantation, filtration or a combination of such methods can be used. Preferably, the recovery is performed in a water-free environment which can be provided by an atmosphere of gases such as ammonia, argon, nitrogen, dry air or the like.

In step (e), the precipitate is washed with a washing solvent to remove traces of the alcohol and non-aqueous solution in the precipitate. Ammonia and a variety of alcohols, such as methanol, ethanol, propanol and butanol can be used as the washing solvent; however, it is preferred that where the washing solvent is an alcohol, the alcohol is saturated with ammonia. U.S. Pat. No. 3,966,888 teaches the use of methanol as the washing solvent. The present inventors have ascertained that the use of methanol alone as the washing solvent results in dissolution of the precipitate. Methanol alone is believed to dissolve both magnesium chloride glycollate compounds and magnesium chloride hexammoniate with the result that product quality is increased and product yield is decreased. Magnesium chloride glycollate compounds are believed to undergo a combination of dissolution and conversion to magnesium chloride hexammoniate when washed with ammoniated methanol while the solubility of magnesium chloride hexammoniate in methanol is believed to decrease with increasing ammonia content in the methanol. Accordingly, washing magnesium chloride hexammoniate containing some magnesium chloride glycollate compounds with ammoniated methanol is believed to result in increased product quality and increased product yield. Preferably, the washing solvent is methanol saturated with ammonia in the temperature range of about 3–40° C., more preferably 20–30° C.

In step (f), the washed precipitate is heated to remove ammonia and form substantially anhydrous magnesium chloride. Any suitable method of heating, such as a calcination kiln, rotary kiln or fluidised bed may be used; however, a fluidised bed is preferred. Preferably, the precipitate is heated in a fluidised bed to a temperature greater than about 380° C. and, more preferably, the temperature is within the range of 400–500° C. Prior to heating to remove ammonia, it is preferred to remove methanol from the washed precipitate where methanol was used in the washing solvent. Any suitable process can be used for methanol removal, including placing the washed precipitate under vacuum. However, it is preferred that methanol is removed by heating the washed precipitate at a temperature below 120° C.

As previously mentioned, it is preferred that the non-aqueous solution is a solution of the alcohol which is admixed with hydrated magnesium chloride. To optimise the economics of the process according to the present invention, it is preferred to recover and recycle various chemicals used in the process. For example, it is preferred to recover alcohol from the reaction vessel following recovery of the precipitate from the reaction vessel and to recycle the recovered alcohol for admixture with fresh hydrated magnesium chloride.

Depending upon the source of hydrated magnesium chloride, salts such as calcium chloride, potassium chloride and sodium chloride can be introduced into the process with the hydrated magnesium chloride in step (a). Such salts do not precipitate during formation of the magnesium chloride hexammoniate precipitate in step (c) and hence will accumulate in the process if alcohol from the reaction vessel following recovery of the precipitate is recycled into step (a), as is preferred. Because the salts do not precipitate in step (c), their presence is tolerable. However, if the concentration of the salts is allowed to progressively increase by introduction in step (a), the efficiency of the process will eventually deteriorate. Accordingly, it is preferred to periodically or continuously remove the salts from the process and this is preferably performed as part of the recovery and recycling of alcohol from the reaction vessel following recovery of the precipitate from the reaction vessel. Various approaches are available for removal of the salts to allow recovery and recycling of alcohol. For example, the salts can be removed by withdrawing a portion of the alcohol containing the salts; however, this results in an undesirable loss of alcohol. The present inventors have developed two preferred methods for recovery of alcohol from the reaction vessel which enable salt removal.

The first method is preferably used if calcium chloride is present in the alcohol and comprises the steps of:
  (i) removing any ammonia or polar solvent, such as methanol, from alcohol from the reaction vessel;
  (ii) mixing a soluble magnesium bicarbonate solution with the alcohol from step (i) to form a mixture of magnesium bicarbonate and alcohol;
  (iii) heating the mixture of magnesium bicarbonate and alcohol to form a precipitate of calcium carbonate; and
  (iv) separating the calcium carbonate precipitate.

In step (i), the ammonia and polar solvent may be removed by any suitable method. For example, the alcohol may be distilled to remove any ammonia or polar solvent. This is preferred as it allows for reuse of removed ammonia and polar solvent.

In step (ii), the alcohol can be mixed directly with the magnesium bicarbonate solution but it is preferred to evaporate sufficient alcohol to produce an alcohol solution containing 15%–35% by weight calcium chloride. More preferably, the alcohol contains about 25% by weight calcium chloride.

Any suitable molar ratio of magnesium bicarbonate to alcohol may be used such that the maximum precipitate of calcium carbonate is formed. Preferably, the molar ratio of magnesium bicarbonate to calcium chloride is in the range 0.8–5, preferably 0.8–1.

Any suitable soluble magnesium bicarbonate solution may be used. For example, magnesium oxide can be mixed with water and then carbon dioxide added to the mixture to form soluble magnesium bicarbonate. Preferably, the temperature during the carbon dioxide addition is maintained in the range 5° C.–25° C., more preferably 13° C.–18° C. Such a solution is preferably used shortly after its manufacture, more preferably within 8 hours of its manufacture.

In heating the mixture of magnesium bicarbonate and alcohol to precipitate calcium carbonate in step (iii), the mixture is preferably heated to 60–120° C. Where the alcohol is a glycol, the temperature is preferably 90–100° C.

Following step (iv), the calcium carbonate precipitate may be washed with water to recover traces of alcohol entrained in the precipitate with the precipitate being separated by any suitable method from the alcohol and water.

The second method allows for removal of substantially all ionic species from alcohol from the reaction vessel. For example, this second method is suitable for removing calcium chloride, sodium chloride, potassium chloride, boron, sulphates and silicates from the alcohol.

The second method comprises the steps of:
(i) removing any ammonia or polar solvent, such as methanol, from the alcohol; and
(ii) continuously adding the alcohol from step (i) to the top of a stripping column in which steam is added continuously to the bottom of the column with a salt/water solution which is substantially free of alcohol being withdrawn from the bottom of the column and a vapour stream of alcohol and water containing no salts being withdrawn from the top of the column.

In step (i), the ammonia and polar solvent may be removed by any suitable method. For example, the alcohol may be distilled to remove any ammonia or polar solvent. This is preferred as it allows for reuse of removed ammonia and polar solvent.

In step (ii), the alcohol from step (i) can be added directly to the stripping column but preferably it is heated to evaporate alcohol to produce an alcohol solution containing 15%–35% by weight total salt content. More preferably, the alcohol contains about 25% by weight total salts.

The alcohol is preferably added to the top of the stripping column at a temperature in the range 15° C.–200° C., preferably 100–150° C. It is also preferred to dilute the alcohol with water to reduce the viscosity of the solution prior to addition to the column. The column may contain any suitable packing or plates, such as is common for distillation processes. Preferably, the steam should be at 1–15 bar (absolute) pressure, more preferably 5–10 bar (absolute) pressure and may contain some superheat. The column pressure is preferably 1–15 bar (absolute), more preferably 5 bar (absolute). The ratio of the alcohol addition rate to the steam addition rate is preferably in the range 0.01–2, more preferably 0.05–0.3.

A gaseous product containing alcohol and no salts is continuously withdrawn from the top of the column and a salt/water solution, containing little alcohol, is continuously withdrawn from the bottom of the column. Preferably, the salt content in the water is 5–40%, more preferably 25–30%.

In addition to recovering and recycling alcohol from the reaction vessel following recovery of the precipitate from the reaction vessel, it is preferred to recover and recycle:
(1) any alcohol removed from the alcohol magnesium chloride solution by dehydration in step (b),
(2) the washings resulting from washing the recovered precipitate, and
(3) ammonia and any alcohol removed from the washed precipitate in step (f).

In a second aspect, the present invention provides substantially anhydrous magnesium chloride prepared by a process according to the first aspect of the present invention.

In a third aspect, the present invention provides substantially anhydrous magnesium chloride containing less than 0.05% by weight magnesium oxide and preferably less than 40 ppm calcium.

Magnesium chloride according to the third aspect of the present invention can be prepared by the process according to the first aspect of the present invention.

COMPARATIVE EXAMPLES

The ensuing examples are illustrative of the process according to U.S. Pat. No. 3,966,888 and the Allain paper. The examples are provided for comparative purposes only.

Comparative Example 1

Into a 5-neck, 2 litre round bottom flask fitted with a thermometer, magnetic stirring bar, a 25 mm diameter packed distillation column with reflux splitter, condenser and receiver, was placed 1302 grams of ethylene glycol. To this was added 429 grams of a water and magnesium chloride solution containing 33.6% (w/w) magnesium chloride. The flask was evacuated by means of a vacuum pump to 50 mm Hg of pressure. An electric heating mantle with a magnetic stirrer was placed under the flask and the temperature was slowly raised to 150° C. over a period of 6 hours in order to distil away the water. Top condensate, almost pure water, was refluxed to the column with a reflux ratio of 1 to reduce ethylene glycol losses to the condensate.

On completion of distillation removal of the water the ethylene glycol magnesium chloride solution was analysed for water by Karl Fisher titration and was found to contain 300 ppm water. The contents of the flask was maintained at 150° C. using the heating mantle.

A separate 5-neck, 1 litre flat bottom flask was fitted with an overhead stirrer, an ammonia gas sparging tube fitted with a glass frit, and a thermometer and was placed in a refrigerated water bath. To the flask was added 1000 g of the dehydrated ethylene glycol magnesium chloride solution and the flask and contents were cooled to 15° C. using a refrigerated water bath. The liquor was very viscous and difficult to agitate.

Anhydrous ammonia flow was commenced from a gas cylinder via a pressure regulator. The high solution viscosity made it extremely difficult to obtain any ammonia flow through the glass frit. The ammonia supply pressure was increased to alleviate this problem, however, this resulted in the sparging tube and frit exploding releasing a large volume of pressurised ammonia into the crystalliser. This in turn blew out ports in the lid and discharged ethylene glycol magnesium chloride solution and ammonia gas in a violent manner from the vessel.

An assay confirmed that the solution viscosity was about 120 mPas.

In order to alleviate the difficulty in ammonia injection at 15° C. due to the high solution viscosity, the test was repeated with the ammonia added to the ethylene glycol magnesium chloride solution at 60° C. The solution temperature was maintained by using a water bath with provision for heating and cooling.

Ammonia was added to the flat bottom flask containing the ethylene glycol magnesium chloride solution at a rate of 3.0 grams per minute. This was continued until the vessel and contents reached constant weight indicating saturation of the solution with ammonia, also evidenced by ammonia exiting the flask via a dreschel trap containing ethylene glycol. The change in weight of the flask contents, which included some crystals which had formed, was 149 grams. This indicated that a mole ratio of ammonia to magnesium chloride of 7.87 had been achieved.

The solution and crystals were then allowed to cool slowly to 20° C. over a period of 16 hours while mixing was continued. The contents of the flask were then removed in a glove box under an argon atmosphere and were placed in a laboratory basket centrifuge fitted with a polypropylene filter cloth. The slurry was then centrifuged for 10 minutes.

The filter cake was collected and analysed and was found to contain 24.2% by weight magnesium chloride, 0.7% by weight calcium chloride, 7.3% by weight ammonia and 68.5% by weight glycol which includes both free ethylene glycol and glycol ligands of any magnesium chloride glycollate compounds. The magnesium chloride and calcium chloride contents were determined by ethylenediaminetetraacetic acid (EDTA) titration, the ammonia content was determined by Kjeldahl analysis and the glycol content by High Pressure Liquid Chromatography (HPLC). The ammonia and magnesium chloride contents of 7.3 and 24.2% by weight respectively indicate a mole ratio of ammonia to magnesium chloride in the damp crystal of 1.7:1.0 which is well removed from the ratio of 6.0:1.0 expected for pure magnesium chloride hexammoniate. The presence of both magnesium chloride triglycollate and magnesium chloride biglycollate biammoniate were confirmed by both XRD and FTIR spectroscopy.

Comparative Example 2

Into a 5-neck, 2 litre round bottom flask fitted with a thermometer, magnetic stirring bar, a 25 mm diameter packed distillation column with reflux splitter, condenser and receiver, was placed 1000 grams of ethylene glycol. To this was added 413 grams of a water and magnesium chloride solution container 33% (w/w) magnesium chloride. The flask was evacuated by means of a vacuum pump to 50 mm Hg of pressure. An electric heating mantle with a magnetic stirrer was placed under the flask and the temperature was slowly raised to 150° C. over a period of 6 hours in order to distil away the water. Top condensate, almost pure water, was refluxed to the column with a reflux ratio of 1 to reduce ethylene glycol losses to the condensate. On completion of distillation removal of the water the dehydrated ethylene glycol magnesium chloride solution was maintained at 150° C. using the heating mantle.

A separate 5 neck, 1 litre flat bottom flask was fitted with an overhead stirrer, an open ended glass ammonia gas sparging tube and a thermometer and was placed in a refrigerated water bath. To the flask was added 443 g of the dehydrated ethylene glycol magnesium chloride solution and the contents of the flask were cooled to 15° C. in the refrigerated water bath. Anhydrous ammonia gas was sparged into the liquid contents of the flask and the contents of the flask were maintained at 15° C. during this addition. A grainy precipitate formed soon after the addition of the ammonia gas to the dehydrated ethylene glycol magnesium chloride solution and continued to form during the addition of the ammonia gas. The weight of the flask was monitored during the ammonia gas addition and this addition was stopped after 85 g of ammonia had been added to the dehydrated ethylene glycol magnesium chloride solution. This represents a 50% excess of ammonia over the amount required to complex all of the initial magnesium chloride in the dehydrated ethylene glycol magnesium chloride solution as magnesium chloride hexammoniate. On a molar basis the total ammonia to magnesium chloride ratio in the slurry after completion of the ammonia addition was 9.0:1.0.

Most of the contents of the flask were removed from the flask in a glove box under a nitrogen atmosphere and placed in a laboratory basket centrifuge fitted with a polypropylene filter cloth. The slurry was then centrifuged for 10 minutes. The remaining contents of the flask were poured onto a pad of paper tissue and left for 10 minutes in the glove-box under a nitrogen atmosphere for the liquid to be absorbed and to leave substantially drier crystal suitable for XRD analysis.

The crystals from both the centrifuged and liquid absorption samples were analysed by XRD. These analyses demonstrated the presence of a mixture of magnesium chloride biglycollate biammoniate and magnesium chloride hexammoniate in both samples.

BEST MODES FOR CARRYING OUT INVENTION

The ensuing examples are illustrative of preferred embodiments of the present invention and should not be construed as limiting the scope of the present invention in any way.

EXAMPLE 1

Batch Production of Anhydrous Magnesium Chloride in Ethylene Glycol

Into a 5-neck, 2 litre round bottom flask fitted with a thermometer, magnetic stirring bar, a 25 mm diameter packed distillation column with reflux splitter, condenser and receiver, was placed 1000 grams of ethylene glycol. To this was added 535 grams of a water and magnesium chloride solution containing 33% (w/w) magnesium chloride. The flask was evacuated by means of a vacuum pump to 50 mm Hg of pressure. An electric heating mantle with a magnetic stirrer was placed under the flask and the temperature was slowly raised to 150° C. over a period of 6 hours in order to distil away the water. Top condensate, almost pure water, was refluxed to the column with a reflux ratio of 1 to reduce ethylene glycol losses to the condensate.

On completion of distillation removal of the water the dehydrated ethylene glycol magnesium chloride solution was analysed for water by Karl Fisher titration and was found to contain 200 ppm water. The contents of the flask were maintained at 150° C. using the heating mantle.

A separate 5 neck, 1 litre flat bottom flask was fitted with an overhead stirrer, an ammonia gas sparging tube and a thermometer and was placed in a refrigerated water bath. To the flask was added 100 g of ethylene glycol which was saturated with anhydrous ammonia at 15° C. The dehydrated ethylene glycol magnesium chloride solution was then pumped into the flat bottom flask over a period of 4 hours while anhydrous ammonia gas was simultaneously sparged into the liquid contents of the flask. Sufficient ammonia was added to be in 20% excess to that required, as evidenced by ammonia gas exiting the flask by a gas flow rotameter. The contents of the flask were maintained at 15° C. during addition of the ethylene glycol magnesium chloride solution by adjusting the water bath temperature. A grainy precipitate formed almost immediately on addition of the ethylene glycol magnesium chloride solution to the ammonia saturated ethylene glycol and continued to form during the continuous addition of the dehydrated ethylene glycol magnesium chloride solution and ammonia over the following 4 hours.

The contents of the flask were removed from the flask in a glove box under an argon atmosphere and placed in a laboratory basket centrifuge fitted with a polypropylene filter cloth. The slurry was then centrifuged for 10 minutes. Separately, 500 grams of methanol at 15° C. were saturated with anhydrous ammonia and placed in a wash bottle. The crystals on the centrifuge were then washed while spinning with a stream of ammonia saturated methanol from the wash bottle. The filter cake was analysed and found to contain 46.3% by weight magnesium chloride, 49.7% by weight ammonia, 4.0% by weight methanol and less than 50 ppm glycol. The magnesium chloride content, the ammonia content, the methanol content and the glycol content were determined by EDTA titration, Kjeldahl analysis, HPLC and HPLC respectively. The ammonia and magnesium chloride contents of 49.7 and 46.3% by weight respectively indicate a mole ratio of ammonia to magnesium chloride of 6.1:1.0 which is in good agreement with the ratio of 6.0:1.0 expected for pure magnesium chloride hexammoniate. XRD and FTIR spectroscopy indicated an absence of magnesium chloride glycollate compounds.

About 100 grams of the solids were removed from the centrifuge and placed in a round bottom 500 millilitre flask in the glove box under an argon atmosphere. The flask was fitted with overhead stirrer and glass impellor and also with a glass shielded thermocouple. The flask was placed in a heating mantle and the contents were heated to 650° C. over a period of 3 hours while flushing the flask with dry argon to prevent any water vapour ingress to the flask. The final solids were assayed and found to contain less then 50 ppm ammonia and 0.04% magnesium oxide, the remainder being magnesium chloride. The ammonia, magnesium oxide and magnesium chloride contents were determined by Kjeldahl analysis, hydrochloric acid/sodium hydroxide back titration (acid/base titration), and EDTA titration respectively.

EXAMPLE 2

Batch Production of Magnesium Chloride Hexammoniate in Methanol

Into a 5-neck, 2 litre round bottom flask fitted with a thermometer and a magnetic stirrer bar was added 733 grams of substantially anhydrous methanol. Over a period of 30 minutes 100 grams of anhydrous magnesium chloride was added to the methanol. An electric heating mantle with a magnetic stirrer was placed under the flask and the temperature was raised to 35° C. to dissolve the magnesium chloride in the methanol. This was accomplished in 30 minutes and the small amount of remaining insoluble material was filtered away using a laboratory pressure filter. The clear solution was returned to the round bottom flask and was maintained at 35° C. on the heating mantle.

A separate 5-neck, 1 litre flat bottom flask was fitted with an overhead stirrer, an ammonia gas sparging tube and a thermometer and was placed in a heated water bath. To the flask was added 100 g of methanol which was saturated with ammonia at 35° C. The methanol magnesium chloride solution was then pumped into the flat bottom flask over a period of 4 hours while anhydrous ammonia gas was simultaneously sparged into the liquid contents of the flask. Sufficient ammonia was added to be in 20% excess to that required, as evidenced by ammonia gas exiting the flask by a gas flow rotameter. The contents of the flask were maintained at 35° C. during addition of the methanol magnesium chloride solution to the ammonia saturated methanol by adjusting the water bath temperature. A grainy precipitate formed almost immediately on addition of the methanol magnesium chloride solution and continued to form during the continuous addition of the methanol magnesium chloride solution and ammonia over the following 4 hours.

The contents of the flask were removed from the flask in a glove box under an argon atmosphere and placed in a laboratory basket centrifuge fitted with a polypropylene filter cloth. The slurry was then centrifuged for 10 minutes. The filter cake was analysed and found to contain 42.0% by weight magnesium chloride, 44.2% by weight ammonia and 13.8% by weight methanol. The magnesium chloride content, the ammonia content and the methanol content were determined by EDTA titration, Kjeldahl analysis and HPLC respectively. The ammonia and magnesium chloride contents of 44.2 and 42.0% by weight respectively indicate a mole ratio of ammonia to magnesium chloride of 5.9:1.0 which is in good agreement with the ratio of 6.0:1.0 expected for pure magnesium chloride hexammoniate. XRD and FTIR spectroscopy indicated an absence of magnesium chloride glycollate compounds.

EXAMPLE 3

Batch Production of Magnesium Chloride Hexammoniate in Diethylene Glycol

Into a 5-neck, 2 litre round bottom flask fitted with a thermometer, magnetic stirring bar, a 25 mm condenser and receiver, was placed 1300 grams of diethylene glycol. To this was added 200 grams of a water and magnesium chloride solution containing 32% (w/w) magnesium chloride. The flask was evacuated by means of a vacuum pump to 50 mm Hg of pressure. An electric heating mantle with a magnetic stirrer was placed under the flask and the temperature was slowly raised to 170° C. over a period of 6 hours in order to distil away the water. Top condensate, almost pure water, was refluxed to the column with a reflux ratio of 1 to reduce diethylene glycol losses to the condensate.

On completion of distillation removal of the water the dehydrated diethylene glycol magnesium chloride solution was analysed for water by Karl Fisher titration and was found to contain 200 ppm water. The contents of the flask were then reduced to ambient temperature.

A separate 5-neck, 1 litre flat bottom flask was fitted with an overhead stirrer, an ammonia gas sparging tube and a thermometer and was placed in a refrigerated water bath. The flask was fitted with an overflow side arm. To the flask was added 800 g of diethylene glycol which was saturated with anhydrous ammonia at 15° C. and seed crystals of magnesium chloride hexammoniate were added. The dehydrated diethylene glycol magnesium chloride solution was then pumped into the flat bottom flask over a period of 5 hours while anhydrous ammonia gas was simultaneously sparged into the liquid contents of the flask. Product slurry overflowed the side arm and was collected in a sealed 2 litre flask. Sufficient ammonia was added to be in 20% excess to that required, as evidenced by ammonia gas exiting the flask by a gas flow rotameter. The contents of the flask were maintained at 15° C. during addition of the dehydrated diethylene glycol magnesium chloride solution by adjusting the water bath temperature. A fine precipitate formed almost immediately on addition of the dehydrated diethylene glycol magnesium chloride solution to the ammonia saturated diethylene glycol and continued to form during the continuous addition of the dehydrated diethylene glycol magnesium chloride solution and ammonia over the following 5 hours.

The contents of the flask were removed from the flask in a glove box under an argon atmosphere and placed in a laboratory basket centrifuge fitted with a polypropylene filter cloth. The slurry was then centrifuged for 10 minutes and washed with methanol saturated with ammonia. The filter cake was analysed and found to contain 39.1% by weight magnesium chloride, 40.3% by weight ammonia, 0.7% by weight diethylene glycol with the residual being wash liquor. The magnesium chloride content, the ammonia content and the diethylene glycol content were determined by EDTA titration, Kjeldahl analysis and HPLC respectively. The ammonia and magnesium chloride contents of 40.3 and 39.1% by weight respectively indicate a mole ratio of ammonia to magnesium chloride of 5.8:1.0 which is in good agreement with the ratio of 6.0:1.0 expected for pure magnesium chloride hexammoniate.

EXAMPLE 4

Single Stage Continuous Crystallisation of Magnesium Chloride Hexammoniate

Into a 3-neck, 20 litre round bottom flask fitted with a proprietary spinning band still (B/R Instrument Corp.) was added 12 kg of ethylene glycol and a solution of 6.6 kg of 33% by weight magnesium chloride in water.

The flask was evacuated by means of a vacuum pump to 50 mm Hg of pressure. An electric heating mantle with a magnetic stirrer was placed under the flask and the temperature was slowly raised to 150° C. over a period of 6 hours in order to distil away the water. Top condensate, almost pure water, was refluxed to the column with a reflux ratio of 2 to reduce ethylene glycol losses to the condensate.

On completion of distillation removal of the water the dehydrated ethylene glycol magnesium chloride solution was analysed for water by Karl Fisher titration and was found to contain 300 ppm water. The contents of the flask were maintained at 150° C. using the heating mantle.

A 2 litre crystalliser was fitted with electronic high and low level controls which activated a peristaltic pump which transferred crystal slurry from the crystalliser to a product receiving vessel at about 10 minute intervals. Feed liquor consisting of the dehydrated ethylene glycol magnesium chloride solution was pumped continuously to the crystalliser. The crystalliser consisted of a 2 litre vessel fitted with a standard ground glass flange at the top. The lid of the crystalliser was machined from 316 stainless steel and contained a mechanical seal assembly for the stirrer as well as access points for feed addition, ammonia sparging tube, thermowell and product removal and excess ammonia venting. The crystalliser body was suspended from the lid of the vessel into a 5 litre beaker into which flowed chilled water to maintain the desired crystallisation temperature. Ammonia gas flowed via a rotameter into the vessel beneath the bottom impellor of two four blade propeller agitators, which were driven by an overhead laboratory stirrer.

The chilled water flow to the crystalliser was adjusted to give a crystalliser operating temperature of 30° C.

Prior to commencing feed to the crystalliser, it was filled with ammonia saturated ethylene glycol and was seeded with magnesium chloride hexammoniate.

The dehydrated ethylene glycol magnesium chloride solution was then pumped into the crystalliser at a rate of 2.5 kg/hr. Excess ammonia was added to the crystalliser as noted by ammonia gas exiting the crystalliser by a gas flow rotameter. During the 5 hour operation of the crystalliser the ammonia level in the ethylene glycol in the crystalliser was typically 12% (w/w).

The contents of the product slurry receiver were pumped to a 355 mm diameter basket centrifuge fitted with a polypropylene filter cloth. During loading of the centrifuge the speed was controlled to 1250 rpm and was subsequently increased to 1780 rpm during drainage. Separately 8 kg of methanol at 20° C. was saturated with anhydrous ammonia in a glass vessel. This was then pumped onto the crystals on the centrifuge with the basket spinning at 1780 rpm. After washing was completed the crystals were spun for a further 10 minutes to minimise their methanol content.

Samples of the centrifuged, washed crystals were analysed and found to contain 47.8% by weight magnesium chloride, 50.1% by weight ammonia and 348 ppm calcium chloride. The magnesium chloride and calcium chloride contents were determined by EDTA titration and the ammonia content was determined by Kjeldahl analysis. The ammonia and magnesium chloride contents of 50.1 and 47.8% by weight respectively indicate a mole ratio of ammonia to magnesium chloride of 5.9:1.0 which is in good agreement with the ratio of 6.0:1.0 expected for pure magnesium chloride hexammoniate. XRD and FTIR spectroscopy indicated an absence of magnesium chloride glycollate compounds.

EXAMPLE 5

Two Stage Continuous Crystallisation of Magnesium Chloride Hexammoniate

Into a 3-neck, 20 litre round bottom flask fitted with a proprietary spinning band still (B/R Instrument Corp.) was added 12 kg of ethylene glycol and a solution of 6.6 kg of 33% magnesium chloride (w/w) in water.

The flask was evacuated by means of a vacuum pump to 50 mm Hg of pressure. An electric heating mantle with a magnetic stirrer was placed under the flask and the temperature was slowly raised to 150° C. over a period of 6 hours in order to distil away the water. Top condensate, almost pure water, was refluxed to the column with a reflux ratio of 2 to reduce ethylene glycol losses to the condensate.

On completion of distillation removal of the water the dehydrated ethylene glycol magnesium chloride solution was analysed for water by Karl Fisher titration and was found to contain 300 ppm water. The contents of the flask were maintained at 150° C. using the heating mantle.

Two 2 litre crystallisers were connected in series each fitted with electronic high and low level controls which activated peristaltic pumps which transferred crystal slurry from the first crystallier to the second crystalliser, and from the second crystalliser to a product receiving vessel at about 10 minute intervals. Feed liquor consisting of the dehydrated ethylene glycol magnesium chloride solution was pumped continuously to the first crystalliser. Each crystalliser consisted of a 2 litre glass vessel fitted with a standard ground glass flange at the top. The lids of the crystallisers were machined from 316 stainless steel and contained a mechanical seal assembly for the stirrer as well as access ports for feed liquor addition, ammonia sparging tube, thermowell and product removal and excess ammonia venting. The crystalliser bodies were suspended from the lids of the vessels into 5 litre beakers into which flowed chilled water to maintain the desired crystallisation temperatures. Ammonia gas flowed via rotameters into the vessels beneath the bottom impellers of two four blade propeller agitators, which were driven by overhead laboratory stirrers.

The chilled water flow to the crystallisers was adjusted to give a first crystalliser operating temperature of 59° C. and a second crystalliser operating temperature of 39° C. Prior to commencing feed to the first crystalliser, both crystallisers were filled with ammonia saturated ethylene glycol and were seeded with magnesium chloride hexammoniate.

The dehydrated ethylene glycol magnesium chloride solution was then pumped into the first crystalliser at a rate of 3.2 kg/hr. Excess ammonia was added to each crystalliser as noted by ammonia gas exiting each crystalliser by a gas flow rotameter. During the 5 hour operation of the crystallisers in series the ammonia level in the ethylene glycol in the crystallisers varied between 7.1% (w/w) and 11.8% (w/w).

The contents of the product slurry receiver were pumped to a 355 millimetre diameter basket centrifuge fitted with a polypropylene filter cloth. During loading of the centrifuge the speed was controlled to 1250 rpm and was subsequently increased to 1780 rpm during drainage. Separately, 8 kg of methanol at 20° C. was saturated with anhydrous ammonia in a glass vessel. This was then pumped onto the crystals on the centrifuge with the basket spinning at 1780 rpm. After washing was completed the crystals were spun for a further 10 minutes to minimise their methanol content.

Samples of the centrifuged, washed crystals were analysed and found to contain 51.4% by weight magnesium chloride and 49.3% by weight ammonia. The magnesium chloride content and ammonia content were determined by EDTA titration and Kjeldahl analysis respectively. The ammonia and magnesium chloride contents indicate a mole ratio of ammonia to magnesium chloride of 5.4:1.0 which is in fair agreement with the ratio of 6.0:1.0 expected for pure magnesium chloride hexammoniate. XRD and FTIR spectroscopy indicated an absence of magnesium chloride glycollate compounds.

EXAMPLE 6

Effect of Water Level in Dehydrated Glycol Magnesium Chloride Solution on Anhydrous Magnesium Chloride and Magnesium Oxide Levels Into a 5-neck, 2 litre round bottom flask fitted with a thermometer, magnetic stirring bar, a 25 mm diameter packed distillation column with reflux splitter, condenser and receiver, was placed 2000 grams of ethylene glycol. To this was added 535 grams of a water and magnesium chloride solution containing 33% (w/w) magnesium chloride. The flask was evacuated by means of a vacuum pump to 50 mm Hg of pressure. An electric heating mantle with a magnetic stirrer was placed under the flask and the temperature was slowly raised to 150° C. over a period of 6 hours in order to distil away the water. Top condensate was initially almost pure water but was pure ethylene glycol by completion of the distillation. Pure ethylene glycol was then added to the dehydrated ethylene glycol magnesium chloride solution to adjust the magnesium chloride concentration to 15% (w/w).

On completion of distillation removal of the water and adjustment of the magnesium chloride level, the dehydrated ethylene glycol magnesium chloride solution was analysed for water by Karl Fisher titration and was found to contain 320 ppm water. The contents of the flask were maintained at 150° C. using the heating mantle.

A separate 5-neck, 1 litre flat bottom flask was fitted with an overhead stirrer, an ammonia gas sparging tube and a thermometer and was placed in a refrigerated water bath. To the flask was added 100 g of ethylene glycol which was saturated with anhydrous ammonia at 30° C. The dehydrated ethylene glycol magnesium chloride solution was then pumped into the flat bottom flask over a period of 4 hours while anhydrous ammonia gas was simultaneously sparged into the liquid contents of the flask. Sufficient ammonia was added to be in 20% excess to that required, as evidenced by ammonia gas exiting the flask by a gas flow rotameter. The contents of the flask were maintained at 30° C. during addition of the dehydrated ethylene glycol magnesium chloride solution by adjusting the water bath temperature. A grainy precipitate formed almost immediately on addition of the dehydrated ethylene glycol magnesium chloride solution to the ammonia saturated ethylene glycol and continued to form during the continuous addition of the dehydrated ethylene glycol magnesium chloride solution and ammonia over the following 4 hours.

The contents of the flask were removed from the flask in a glove box under an argon atmosphere and placed in a laboratory basket centrifuge fitted with a polypropylene filter cloth. The slurry was then centrifuged for 10 minutes. Separately, 500 grams of anhydrous methanol containing 290 ppm water at 15° C. was saturated with anhydrous ammonia and placed in a wash bottle. The crystals on the centrifuge were then washed while spinning with a stream of ammonia saturated methanol from the wash bottle. The solids were repulp washed in 500 grams of 15° C. ammonia saturated methanol for a period of 2 minutes and were then recentrifuged. XRD analysis of samples of the repulp washed, recentrifuged crystals indicated an absence of magnesium chloride glycollate compounds.

About 20 grams of the solids were removed from the centrifuge and placed in a round bottom 200 millilitre flask in the glove box under an argon atmosphere. The flask was fitted with overhead stirrer and glass impellor and also with a glass shielded thermocouple. The flask was placed in a heating mantle and the contents were heated to 450° C. for a period of 3 hours while flushing the flask with dry argon to prevent any water vapour ingress to the flask. The final solids were assayed by acid/base titration and found to contain 0.22% magnesium oxide.

The entire test procedure was repeated five more times with the water content of the dehydrated ethylene glycol magnesium chloride solution adjusted to 960 ppm, 5050 ppm, 5140 ppm, 9830 ppm and 50560 ppm in the different tests. The resulting calcined magnesium chloride contained 0.25%, 0.21%, 0.19%, 0.35% and 0.28% magnesium oxide, respectively. These results indicated little dependence between the calcine magnesium oxide concentration and the concentration of water in the dehydrated ethylene glycol magnesium chloride solution up to a water level of 50560 ppm. FTIR assays on the calcine products indicated the presence of small amounts of a pyridine derivative which assayed as magnesium oxide in the acid-base titration used to determine magnesium oxide content thereby incorrectly elevating the magnesium oxide content. XRD assay also indicated the presence of magnesium silicates formed by reaction of the anhydrous magnesium chloride with the sodium silicate gland calciner at elevated temperatures. These silicates also assayed as magnesium oxide in the acid-base titration Later experiments showed that the pyridine compounds were destroyed at 650° C. and that the true magnesium oxide level was less than 0.1% when a non-reactive quartz calciner was used.

EXAMPLE 7

Effect of Water Level in Dehydrated Glycol Magnesium Chloride Solution on Anhydrous Magnesium Chloride and Magnesium Oxide Levels Into a 5-neck, 2 litre round bottom flask fitted with a thermometer, magnetic stirring bar, a 25 mm diameter packed distillation column with reflux splitter, condenser and receiver, was placed 2000 grams of ethylene glycol. To this was added 535 grams of a water and magnesium chloride solution containing 33% (w/w) magnesium chloride. The flask was evacuated by means of a vacuum pump to 50 mm Hg of pressure. An electric heating mantle with a magnetic stirrer was placed under the flask and the temperature was slowly raised to 150° C. over a period of 6 hours in order to distil away the water. Top condensate was almost pure water initially but was pure ethylene glycol by completion of the distillation. Pure ethylene glycol was then added to the dehydrated ethylene glycol magnesium chloride solution to adjust the magnesium chloride concentration to 15% (w/w).

On completion of distillation removal of the water and adjustment of the magnesium chloride level, the dehydrated ethylene glycol magnesium chloride solution was analysed for water by Karl Fisher titration and was found to contain 55 ppm water. The contents of the flask were maintained at 150° C. using the heating mantle.

A separate 5-neck, 1 litre flat bottom flask was fitted with an overhead stirrer, an ammonia gas sparging tube and a thermometer and was placed in a refrigerated water bath. To the flask was added 100 g of ethylene glycol which was saturated with anhydrous ammonia at 35° C. The dehydrated ethylene glycol magnesium chloride solution was then pumped into the flat bottom flask over a period of 4 hours while anhydrous ammonia gas was simultaneously sparged into the liquid contents of the flask. Sufficient ammonia was added to be in 20% excess to that required, as evidenced by ammonia gas exiting the flask by a gas flow rotameter. The contents of the flask were maintained at 35° C. during addition of the dehydrated ethylene glycol magnesium chloride solution by adjusting the water bath temperature. A grainy precipitate formed almost immediately on addition of the dehydrated ethylene glycol magnesium chloride solution to the ammonia saturated ethylene glycol and continued to form during the continuous addition of the dehydrated ethylene glycol magnesium chloride solution and ammonia over the following 4 hours.

The contents of the flask were removed from the flask in a glove box under an argon atmosphere and placed in a laboratory basket centrifuge fitted with a polypropylene filter cloth. The slurry was then centrifuged for 20 minutes. Separately, 500 grams of anhydrous methanol at 15° C. were saturated with anhydrous ammonia and placed in a wash bottle. The crystals on the centrifuge were then washed while spinning with a stream of ammonia saturated methanol from the wash bottle. XRD analysis of samples of the washed, centrifuged crystals indicated an absence of magnesium chloride glycollate compounds.

About 20 grams of solids were removed from the centrifuge and placed in a 20 millimetre diameter quartz glass tube 400 millimetres in length. The top of the tube was sealed from the atmosphere and argon, dried through a series of tubes containing 3A molecular sieves, was used to gently flush the head space in the tube. Gas discharging from the tube was passed through two anhydrous ethylene glycol dreschel bottle traps to ensure no back diffusion of moist air.

The quartz tube was placed vertically in a tube furnace and the temperature of the furnace was raised to 650° C. over a period of 4 hours. The final solids were assayed by acid-base titration and found to contain less than 0.02% magnesium oxide.

The entire test procedure was repeated two more times with the water content of the dehydrated ethylene glycol magnesium chloride solution adjusted to 300 ppm in one case and 500 ppm in the other. The resulting calcined magnesium chloride contained 0.08% magnesium oxide and 0.07% magnesium oxide, respectively. These tests illustrated that at water levels up to 500 ppm in the dehydrated ethylene glycol magnesium chloride solutions, anhydrous magnesium chloride containing less than 0.1% magnesium oxide could be produced.

EXAMPLE 8

Calcium Removal From Recycled Glycol

Into a 3-neck, 2 litre round bottom flask fitted with a magnetic stirrer bar, thermometer and condenser and some magnesium chloride was placed 900 grams of ethylene glycol containing calcium chloride and some magnesium chloride. The flask was evacuated with a vacuum pump to 50 mm Hg and ethylene glycol was evaporated at 150° C. from the mixture over a period of 5 hours. At the completion of the evaporation 100 g of solution remained which was assayed by EDTA titration and found to contain 171 g/kg calcium chloride and 46 g/kg magnesium chloride in ethylene glycol. This solution was maintained at 100° C.

A separate 1 litre flat bottom culture flask was fitted with a 3-neck lid and an overhead stirrer with a stainless steel impellor in addition to a carbon dioxide sparging tube. This apparatus was placed in a refrigerated water bath and 500 grams of deionised water was added to the flask which was cooled to 15° C. The water was then sparged with carbon dioxide and over a period of two hours 15.8 grams of finely powdered magnesium oxide was added to the water carbon dioxide mixture. Carbon dioxide was added at the rate of 250 millilitres per minute to ensure an excess to the actual requirement. During the magnesium oxide addition the temperature of the liquid was carefully maintained at 15° C. The resulting liquor was analysed and found to contain 14.3 grams/kilogram of magnesium (magnesium bicarbonate).

To 90 grams of the concentrated calcium chloride magnesium chloride ethylene glycol solution was added 253 grams of the magnesium bicarbonate solution over a period of 30 minutes. A precipitate formed immediately on addition of the magnesium bicarbonate. The mixture was maintained at 100° C. throughout the magnesium bicarbonate addition and for a further 15 minutes on completion of addition.

The contents of the flask, which was a mixture of calcium carbonate solids and magnesium chloride, ethylene glycol and water in solution was placed into a Buchner funnel fitted with a filter paper. The solids filtered readily and were then washed with 50 grams of water.

The filtered liquor was assayed by atomic absorption spectroscopy and indicated that 91% of the calcium in the concentrated calcium chloride magnesium chloride ethylene glycol solution had been precipitated.

EXAMPLE 9

Steam Stripping of Salts From Recycled Glycol

Into a 3-neck, 2 litre round bottom flask fitted with a magnetic stirrer bar, thermometer and condenser was placed 1700 grams of ethylene glycol containing calcium chloride and some magnesium chloride. The flask was evacuated to 50 mm Hg with a vacuum pump and ethylene glycol was then boiled away from the solution over 6 hours at 150° C. A sample of the resulting solution was assayed and found to contain 7.2% magnesium chloride, 24.6% calcium chloride and 68.2% ethylene glycol. The magnesium chloride, calcium chloride and ethylene glycol contents were determined by EDTA titration, EDTA titration and HPLC respectively.

A sample of 200 grams of the concentrated salt ethylene glycol solution was diluted with 132 grams of water to reduce the solution viscosity. This diluted mixture was kept at 120° C. and was pumped into the top of a 25 millilitre diameter column, 400 millimetres high, packed with a Sultzer proprietary packing at the rate of 55 grams per hour. The column pressure was maintained at 5 bar using a pressure regulator and the gas discharging from the column top was condensed and collected in a receiver. Liquid from the bottom of the column discharged into an autoclave vessel from which samples could be collected.

At the same time that the ethylene glycol salt water solution was introduced to the top of the column, steam at 9 bar pressure was fed to the bottom of the column at a rate of 795 grams per hour. The test was run for 6 hours and analyses of the bottom solution from the column showed it to contain 5.6% magnesium chloride, 20.1% calcium chloride, 76.1% water and only 700 ppm ethylene glycol. The magnesium chloride, calcium chloride, water and ethylene glycol contents were determined by EDTA titration, EDTA titration, Karl Fisher titration and HPLC respectively.

EXAMPLE 10

Pilot Plant Production of Anhydrous Magnesium Chloride

A continuous recycling pilot plant was operated to demonstrate the process at a larger scale.

Figure 1:
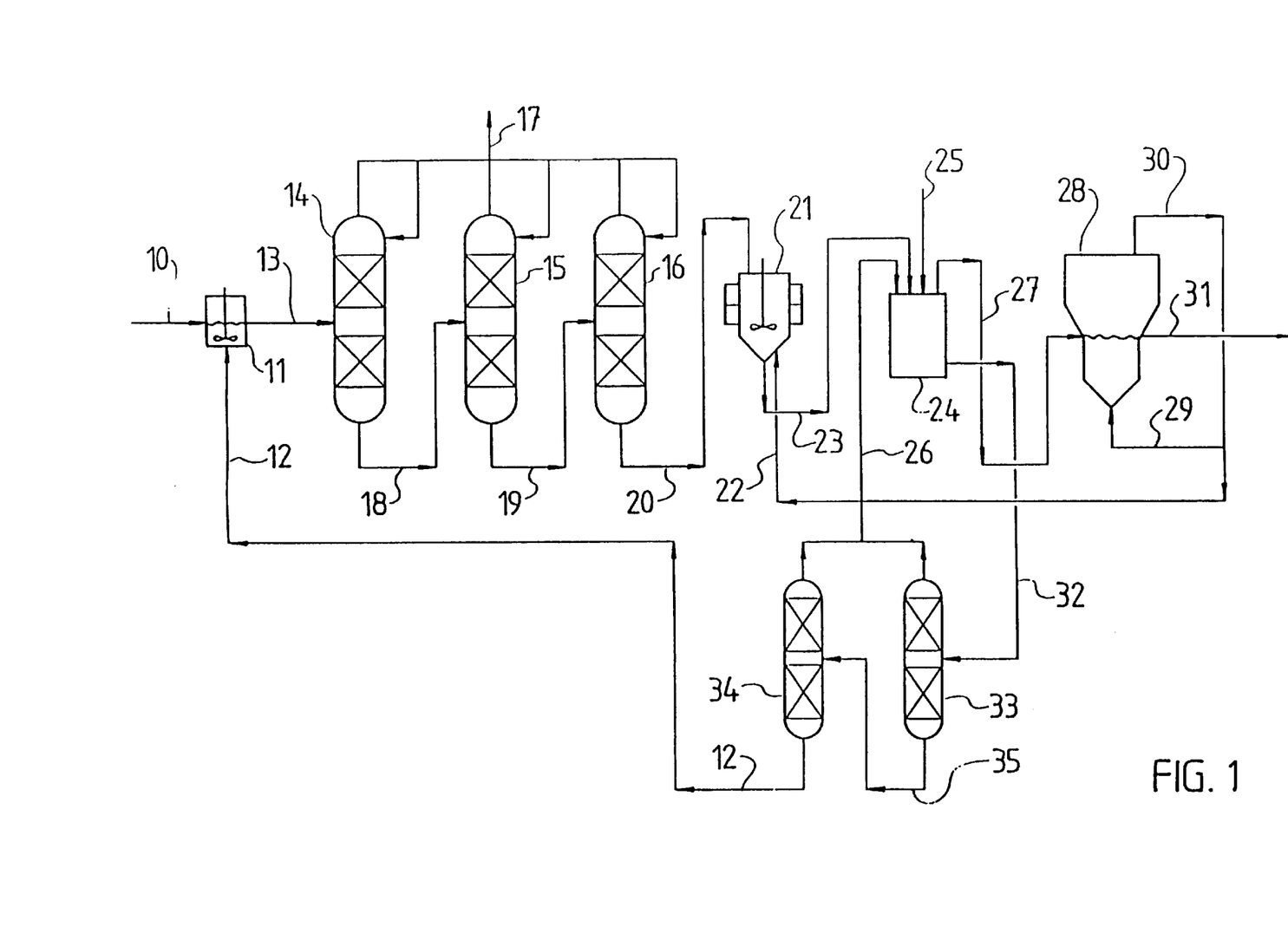
FIG. 1 is a flow diagram of pilot plant production of anhydrous magnesium chloride which is described in Example 10.

A solution of 33% magnesium chloride in water (10) was pumped at a flowrate of 53 grams per minute into a 2 litre glass mixing tank (11) along with recycled ethylene glycol (12) pumped at a flowrate of 100 grams per minute. The two streams were mixed using an overhead stirrer fitted with an impellor. The mixture of ethylene glycol, magnesium chloride and water (13) was then pumped to a series of dehydration distillation columns. The distillation columns (14), (15) and (16) were operated in a fashion familiar to those skilled in the art of distillation to effect the separation of water from the ethylene glycol and magnesium chloride. Energy to the columns was supplied using steam coils in the reboilers and the water (17) was removed from the column top and condensed, with some condensate returned to the column top packing to assist in water/ethylene glycol separation. The dehydration distillation columns (14), (15) and (16) were operated at sequentially increasing vacuum to control the reboiler temperatures to 150° C. to prevent ethylene glycol degradation, while minimising the column size associated with high vacuum dehydration. The bottom product (18) of column (14) was fed to column (15) and the bottom product (19) of column (15) was fed to column (16). Column (14) operated at atmospheric pressure, while columns (15 and 16) operated at a lower pressure.

The bottom product (20) of column (16) had a temperature of approximately 150° C. and was assayed and found to contain 150 ppm water and 15% (w/w) magnesium chloride, the remainder being ethylene glycol.

The dehydrated ethylene glycol/magnesium chloride solution (20) was pumped continuously at a rate of approximately 117 grams per minute to a 20 litre crystalliser (21) simultaneously with the separate addition of 34 grams per minute of anhydrous ammonia gas (22). The crystalliser (21) comprised a flat-bottom tank fitted with four internal baffles and a cooling water jacket. The crystalliser contents were mixed using an overhead stirrer fitted with a four-blade impellor rotating at 750 rpm. The dehydrated ethylene glycol/magnesium chloride solution (20) was added to the crystalliser contents surface while the ammonia (22) was added to the crystalliser slurry via a sparging tube placed underneath the impellor. The cooling water flow was adjusted to control the slurry temperature to 30° C. The crystalliser mother liquor was assayed and found to contain 10% ammonia (w/w).

The crystal slurry (23) was pumped from the crystalliser (21) at a constant rate so as to maintain a steady level of slurry in the crystalliser (21). The slurry (23) discharged into a 15 litre pot pressure filter (24) lined with a polypropylene mesh filter bag. Periodic pressurisation with dry nitrogen (25) filtered the crystalliser mother liquor away from the crystals. After 4 hours flow of slurry (23) to the filter (24) the flow was switched to a second identical filter (not shown) and the approximately 8 kilograms of magnesium chloride hexammoniate crystals were washed in four 4 litre batches of methanol containing 20% (w/w) ammonia (26). After washing the crystals typically contained less than 0.2% by weight ethylene glycol and analysis by XRD indicated that no magnesium chloride glycollate compounds were present.

The washed magnesium chloride hexammoniate crystals (27) were manually removed from the filter (24) and were transferred to a storage bin for continuous feeding to a two-stage fluidised bed calciner (one only illustrated) (28). Recycled ammonia gas (29) was used to fluidise the calciner contents and heating was provided by electrical elements. The units (28) were fitted with overflow pipes which allowed solids to pass continuously from one unit (28) to the next unit (28).

In the first fluid bed (28) the temperature was controlled to 120° C. to allow vaporisation of the methanol in the damp crystals. The second fluid bed (28) operated at 450° C. to calcine the dry crystal to anhydrous magnesium chloride, liberating ammonia gas (30) for continuous recycle to the crystalliser (21). The calcined solids (31) overflowed the second bed (28) and were collected under an inert nitrogen atmosphere in a 20 litre flask sealed from the external atmosphere. The typical calcine solids flowrate was 17 grams per minute. The calcine solids were analysed and found to contain on average less than 40 ppm calcium.

The solvents (32) consisting of an ammonia containing solution of ethylene glycol and methanol and a small quantity of soluble magnesium chloride were pumped continuously at a flowrate of about 180 grams per minute to solvent recovery columns (33) and (34). The first column (33) operated at atmospheric pressure with a reboiler temperature of 150° C. The bottom product (35) of column (33) was pumped continuously to a hard vacuum column (34) and with a reboiler temperature of 130° C. to complete recovery of methanol and ammonia. The columns (33) and (34) were constructed and operated in a manner described previously for the dehydration columns. Ammonia saturated methanol liquid was colleted in the condensers and was recycled to the pressure filters (24) for re-use with the bottom product (12) from the hard vacuum column (34) recycled to the glass mixing tank (11) for re-use.

EXAMPLE 11

Batch Production of Anhydrous Magnesium Chloride in Ethylene Glycol

Into a 5-neck, 2 litre round bottom flask fitted with a thermometer, magnetic stirring bar, a 25 mm diameter packed distillation column with reflux splitter, condenser and receiver, was placed 1000 grams of ethylene glycol. To this was added 535 grams of a water and magnesium chloride solution containing 33% (w/w) magnesium chloride. The flask was evacuated by means of a vacuum pump to 50 mm Hg of pressure. An electric heating mantle with a magnetic stirrer was placed under the flask and the temperature was slowly raised to 150° C. over a period of 6 hours in order to distil away the water. Top condensate, almost pure water, was refluxed to the column with a reflux ratio of 1 to reduce ethylene glycol losses to the condensate. On complete of distillation removal of the water the dehydrated ethylene glycol magnesium chloride solution was maintained at 150° C. using the heating mantle.

A separate 5 neck, 1 litre flat bottom flask was fitted with an overhead stirrer, an ammonia gas sparging tube and a thermometer and was placed in a refrigerated water bath. To the flask was added 250 g of ethylene glycol which was saturated with anhydrous ammonia at 15° C. 150 g of the dehydrated ethylene glycol magnesium chloride solution was then pumped into the flat bottom flask over a period of 2 hours while anhydrous ammonia gas was simultaneously sparged into the liquid contents of the flask. Sufficient ammonia was added to be in excess to that required, as evidenced by ammonia gas exiting the flask. The contents of the flask were maintained at 15° C. during addition of the dehydrated ethylene glycol magnesium chloride solution by adjusting the water bath temperature. A grainy precipitate formed almost immediately on addition of the dehydrated ethylene glycol magnesium chloride solution to the ammonia saturated ethylene glycol and continued to form during the continuous addition of the dehydrated ethylene glycol magnesium chloride solution and ammonia over the following 2 hours.

Most of the contents of the flask were removed from the flask in a glove box under a nitrogen atmosphere and placed in a laboratory basket centrifuge fitted with a polypropylene filter cloth. The slurry was then centrifuged for 10 minutes. The remaining contents of the flask were poured onto a pad of paper tissue and left for 10 minutes in the glove-box under a nitrogen atmosphere for the liquid to be absorbed and to leave substantially drier crystal suitable for XRD analysis.

The crystals from both the centrifuged and liquid absorption samples were analysed by XRD. These analyses demonstrated the presence of only magnesium chloride hexammoniate in both samples, with no magnesium chloride glycollate compounds being detected.

INDUSTRIAL APPLICABILITY

The substantially anhydrous magnesium chloride produced by the process according to the first aspect of the present invention and the magnesium chloride according to the third aspect of the present invention can be used in the electrolytic production of magnesium metal.

TABLE 1

XRD Spectrum of Magnesium Chloride Hexammoniate

| dÅ | Intensity |
|---|---|
| 5.82 | 100 |
| 5.05 | 3 |
| 3.58 | 60 |
| 3.06 | 6 |
| 2.93 | 85 |
| 2.54 | 40 |
| 2.27 | 3 |
| 2.07 | 20 |
| 1.96 | 6 |
| 1.798 | 12 |
| 1.719 | 4 |
| 1.694 | 2 |
| 1.609 | 5 |
| 1.469 | 2 |
| 1.360 | 3 |

TABLE 2

XRD Spectrum of Magnesium Chloride Biglycollate Bimmoniate

| dÅ | Intensity |
|---|---|
| 6.94 | 100 |
| 5.44 | 4 |
| 4.87 | 8 |
| 4.23 | 5 |
| 3.97 | 8 |
| 3.88 | 10 |
| 3.57 | 5 |
| 3.45 | 65 |
| 3.40 | 30 |
| 3.26 | 10 |
| 2.84 | 5 |
| 2.73 | 20 |
| 2.46 | 12 |
| 2.30 | 10 |
| 2.15 | 8 |
| 2.01 | 10 |
| 1.88 | 8 |
| 1.73 | 10 |
| 1.58 | 8 |

TABLE 3

XRD Spectrum of Magnesium Chloride Triglycollate

| dÅ | Intensity |
|---|---|
| 8.35 | 100 |
| 7.17 | 3 |
| 4.19 | 75 |
| 3.99 | 20 |
| 3.60 | 10 |
| 3.07 | 8 |

TABLE 3-continued

XRD Spectrum of
Magnesium Chloride Triglycollate

| dÅ | Intensity |
|---|---|
| 3.01 | 2 |
| 2.81 | 10 |
| 2.20 | 20 |
| 2.24 | 25 |
| 2.11 | 30 |
| 2.07 | 5 |
| 1.58 | 8 |

TABLE 4

FTIR Spectrum of (A) Magnesium Chloride
Hexammoniate and (B) Magnesium Chloride
Biglycollate Biammoniate

| $cm^{-1}$ | (A) | (B) |
|---|---|---|
| 1212 | strong | approximately one third of the intensity of (A) |
| 1251 | intense | approximately one third of the intensity of (A) |
| 1790–1850 | moderately intense | absent |

What is claimed is:

1. A process for producing substantially anhydrous magnesium chloride, the process including the steps of:
   (a) forming an alcohol magnesium chloride solution by admixing hydrated magnesium chloride with an alcohol which is miscible with water;
   (b) dehydrating the alcohol magnesium chloride solution to form a dehydrated alcohol magnesium chloride solution;
   (c) forming a precipitate comprising magnesium chloride hexammoniate by introducing the dehydrated alcohol magnesium chloride solution and ammonia into a reaction vessel containing a non-aqueous solution having an ammonia content of greater than 7% by weight;
   (d) recovering the precipitate from the reaction vessel;
   (e) washing the recovered precipitate with a washing solvent to form a washed precipitate; and
   (f) heating the washed precipitate to form substantially anhydrous magnesium chloride.

2. The process as claimed in claim 1 wherein the non-aqueous solution is saturated with ammonia.

3. The process as claimed in claim 1 wherein the dehydrated alcohol magnesium chloride solution and the ammonia are separately and simultaneously introduced into the reaction vessel.

4. The process as claimed in claim 1 wherein the non-aqueous solution is a solution of the alcohol.

5. The process as claimed in claim 4 wherein alcohol in the reaction vessel following recovery of the precipitate from the reaction vessel is recovered for re-use in the process.

6. The process as claimed in claim 5 wherein the alcohol contains calcium chloride and is recovered by a method comprising the steps of:
   (i) removing any ammonia and/or polar solvent from the alcohol;
   (ii) mixing a soluble magnesium bicarbonate solution with the alcohol from step (i) to form a mixture of magnesium bicarbonate and alcohol;
   (iii) heating the mixture of magnesium bicarbonate and alcohol to form a precipitate of calcium carbonate; and
   (iv) separating the calcium carbonate precipitate from the alcohol.

7. The process as claimed in claim 6 wherein, in step (i), any ammonia and/or polar solvent are removed from the alcohol by distillation.

8. The process as claimed in claim 6 wherein the alcohol mixed with the soluble magnesium bicarbonate in step (ii) contains 15–35% by weight calcium chloride.

9. The process as claimed in claim 6 wherein the molar ratio of magnesium bicarbonate to calcium chloride in step (ii) is in the range 0.8–5.

10. The process as claimed in claim 6 wherein, in step (iii), the mixture of magnesium bicarbonate and alcohol is heated to 60 120° C.

11. The process as claimed in claim 10 wherein the alcohol is a glycol and the magnesium bicarbonate and alcohol is heated to 90–100° C.

12. The process as claimed in claim 5 wherein the alcohol is recovered by a method comprising the steps of:
   (i) removing any ammonia and/or polar solvent from the alcohol; and
   (ii) continuously adding the alcohol from step (i) to the top of a stripping column in which steam is added continuously to the bottom of the column with a salt/water solution which is substantially free of alcohol being withdrawn from the bottom of the column and a vapour stream of alcohol and water containing no salts being withdrawn from the top of the column.

13. The process as claimed in claim 12 wherein, in step (i), any ammonia and/or polar solvent are removed from the alcohol by distillation.

14. The process as claimed in claim 12 wherein the alcohol added to the top of the stripping column contains 15–35% by weight total salt content.

15. The process as claimed in any one of claim 12 wherein the alcohol is added to the top of the stripping column at a temperature in the range 15–200° C.

16. The process as claimed in claim 12 wherein the steam is added to the stripping column at a pressure of 1–15 bar (absolute) and the pressure of the stripping column is 1–15 bar (absolute).

17. The process as claimed in claim 12 wherein the ratio of the alcohol addition rate to the steam addition rate is 0.01–2.

18. The process as claimed in claim 1 wherein the dehydrated alcohol magnesium chloride solution is introduced into the reaction vessel at a temperature less than 45° C.

19. The process as claimed in claim 1 wherein the dehydrated alcohol magnesium chloride solution is introduced into the reaction vessel at a temperature greater than 45° C. and the temperature within the reaction vessel is less than 45° C. on completion of formation of the precipitate.

20. The process as claimed in claim 1 wherein a series of reaction vessels is used in step (c), the dehydrated alcohol magnesium chloride solution is introduced into the first of the series of reaction vessels at a temperature greater than 45° C., and the temperature within the last of the series of reaction vessels is less than 45° C.

21. The process as claimed in claim 1 wherein the alcohol magnesium chloride solution is dehydrated by distillation.

22. The process as claimed in claim 1 wherein the alcohol is selected from the group consisting of methanol, ethanol, propanol, butanol, ethylene glycol and diethylene glycol.

23. The process as claimed in claim 22 wherein the alcohol is ethylene glycol and the alcohol magnesium chloride solution is dehydrated by distillation under vacuum at a temperature less than 150° C.

24. The process as claimed in claim 1 wherein the dehydrated alcohol magnesium chloride solution contains up to 50000 ppm water.

25. The process as claimed in claim 1 wherein the ammonia introduced into the reaction vessel is gaseous anhydrous ammonia.

26. The process as claimed in claim 1 wherein the washing solvent is selected from the group consisting of ammonia, methanol saturated with ammonia, ethanol saturated with ammonia, propanol saturated with ammonia and butanol saturated with ammonia.

27. The process as claimed in claim 26 wherein the washing solvent is methanol saturated with ammonia in the temperature range 3–40° C.

28. The process as claimed in claim 27 wherein the washed precipitate is heated in a fluidised bed at a temperature below 120° C. and thereafter at a temperature within the range 400–500° C.

29. The process as claimed in claim 1 wherein the washed precipitate is heated in a calcination kiln, a rotary kiln or a fluidised bed.

30. The process as claimed in claim 29 wherein the washed precipitate is heated in a fluidised bed at a temperature within the range 400–500° C.

31. Substantially anhydrous magnesium chloride prepared by a process as claimed in claim 1.

32. Magnesium chloride as claimed in claim 31 containing less than 40 ppm calcium.

33. Magnesium chloride as claimed in claim 31 containing less than 0.05% by weight magnesium oxide.

34. A process for producing substantially anhydrous magnesium chloride, the process including the steps of
  (a) forming an ethylene glycol magnesium chloride solution by admixing hydrated magnesium chloride with ethylene glycol;
  (b) distilling the ethylene glycol magnesium chloride solution to form a dehydrated ethylene glycol magnesium chloride solution;
  (c) forming a precipitate comprising magnesium chloride hexammoniate by introducing the dehydrated ethylene glycol magnesium chloride solution and ammonia into a reaction vessel containing ethylene glycol saturated with ammonia;
  (d) recovering the precipitate from the reaction vessel;
  (e) washing the recovered precipitate with a polar solvent saturated with ammonia to form a washed precipitate; and
  (f) heating the washed precipitate to form substantially anhydrous magnesium chloride.

35. Substantially anhydrous magnesium chloride containing magnesium oxide in an amount less than 0.05% by weight.

36. Magnesium chloride as claimed in claim 35 containing calcium in an amount less than 40 ppm.

37. A process for producing substantially anhydrous magnesium chloride, the process including the steps of:
  a) forming an alcohol magnesium chloride solution, by admixing hydrated magnesium chloride with an alcohol which is miscible with water and which is selected from the group consisting of ethylene glycol and diethylene glycol;
  b) dehydrating the alcohol magnesium chloride solution to form a dehydrated alcohol magnesium chloride solution;
  c) forming a precipitate comprising magnesium chloride hexammoniate by introducing the dehydrated alcohol magnesium chloride solution and ammonia into a reaction vessel containing a non-aqueous solution having an ammonia content of greater than 7% by weight;
  d) recovering the precipitate from the reaction vessel;
  e) washing the recovered precipitate with a washing solvent to form a washed precipitate; and
  f) heating the washed precipitate to form substantially anhydrous magnesium chloride.

38. A process for producing substantially anhydrous magnesium chloride, the process including the steps of:
  a) forming an alcohol magnesium chloride solution by admixing hydrated magnesium chloride with an alcohol which is miscible with water and which is selected from the group consisting of ethylene glycol and diethylene glycol;
  b) dehydrating the alcohol magnesium chloride solution to form a dehydrated alcohol magnesium chloride solution containing less than 10,000 ppm water;
  c) forming a precipitate comprising magnesium chloride hexammoniate by introducing the dehydrated alcohol magnesium chloride solution and ammonia into a reaction vessel containing a non-aqueous solution having an ammonia content of greater than 7% by weight;
  d) recovering the precipitate from the reaction vessel;
  e) washing the recovered precipitate with a washing solvent to form a washed precipitate; and
  f) heating the washed precipitate to form substantially anhydrous magnesium chloride.

39. A process for producing substantially anhydrous magnesium chloride, the process including the steps of:
  a) forming an alcohol magnesium chloride solution by admixing hydrated magnesium chloride with an alcohol which is miscible with water and which is selected from the group consisting of ethylene glycol and diethylene glycol;
  b) dehydrating the alcohol magnesium chloride solution to form a dehydrated alcohol magnesium chloride solution;
  c) forming a precipitate comprising magnesium chloride hexammoniate in the absence of ammonium chloride by introducing the dehydrated alcohol magnesium chloride solution and ammonia into a reaction vessel containing a non-aqueous solution having an ammonia content of greater than 7% by weight;
  d) recovering the precipitate from the reaction vessel;
  e) washing the recovered precipitate with a washing solvent to form a washed precipitate; and
  f) heating the washed precipitate to form substantially anhydrous magnesium chloride.

* * * * *